(12) United States Patent
Wijaya et al.

(10) Patent No.: US 6,991,531 B2
(45) Date of Patent: Jan. 31, 2006

(54) VEHICLE AND FRESH AIR INTAKE FOR A VEHICLE

(75) Inventors: Lim Wijaya, Dearborn, MI (US); Maria Heirtzler, Northville, MI (US); Ranganatha Madhavan, Canton, MI (US); Arthur Henke, Ann Arbor, MI (US); Rachid El Aile, Troy, MI (US); Michael Mandernach, Allen Park, MI (US); Carolyn Tatge, Northville, MI (US); Douglas Zhu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/904,037

(22) Filed: Oct. 20, 2004

(65) Prior Publication Data
US 2005/0095974 A1    May 5, 2005

Related U.S. Application Data

(62) Division of application No. 10/605,182, filed on Sep. 12, 2003.

(51) Int. Cl.
*B60J 1/20* (2006.01)
(52) U.S. Cl. ........................ 454/130; 454/128; 454/151
(58) Field of Classification Search ................ 454/131, 454/133, 128; 296/152, 154
See application file for complete search history.

(56) References Cited

U.S. PATENT DOCUMENTS

| | | | |
|---|---|---|---|
| 2,127,971 A | | 8/1938 | Graebner |
| 2,717,045 A | * | 9/1955 | Nallinger .................. 180/68.2 |
| 3,938,856 A | * | 2/1976 | Janssen ..................... 296/154 |
| 4,141,425 A | | 2/1979 | Treat |
| 4,494,790 A | | 1/1985 | Omura |
| 4,721,032 A | * | 1/1988 | Sakamoto .................. 454/146 |
| 4,864,290 A | | 9/1989 | Waters |
| 4,976,327 A | * | 12/1990 | Abujudom et al. ........ 180/68.2 |
| 5,251,953 A | * | 10/1993 | Willey ........................ 296/152 |
| 5,277,656 A | * | 1/1994 | Koukal et al. .............. 454/147 |
| 5,392,873 A | | 2/1995 | Masuyama et al. |
| 5,603,656 A | * | 2/1997 | Baer et al. .................. 454/339 |
| 5,620,057 A | | 4/1997 | Klemen et al. |
| 5,679,074 A | * | 10/1997 | Siegel ........................ 454/147 |
| 5,794,733 A | | 8/1998 | Stosel et al. |
| 5,937,664 A | | 8/1999 | Matsuno et al. |
| 6,085,854 A | | 7/2000 | Nishikawa |

(Continued)

FOREIGN PATENT DOCUMENTS

GB    2 239 432 A    7/1991

(Continued)

*Primary Examiner*—Derek S. Boles
(74) *Attorney, Agent, or Firm*—Brooks Kushman P.C.; Carlos L. Hanze

(57) ABSTRACT

An air intake for a vehicle that facilitates air transfer from an ambient environment outside the vehicle to a vehicle space is provided. The air intake inhibits liquid transfer from the ambient environment to the vehicle space. The air intake includes a housing having an inlet for receiving air from the ambient environment, and an outlet in communication with the inlet. The outlet is disposed in an upper portion of the housing. A blocking member is disposed within the housing adjacent the inlet for preventing upward fluid flow from the inlet directly to the outlet, thereby inhibiting liquid flow through the outlet and into the vehicle space. A portion of the air intake housing is configured for attachment to a vehicle window, and the inlet is configured to be disposed along one edge of the window.

14 Claims, 4 Drawing Sheets

U.S. PATENT DOCUMENTS

| | | | |
|---|---|---|---|
| 6,220,383 B1 * | 4/2001 | Muraki et al. | 180/68.5 |
| 6,224,479 B1 * | 5/2001 | Iino | 454/132 |
| 6,315,069 B1 | 11/2001 | Suba et al. | |
| 6,315,354 B1 | 11/2001 | Tani et al. | |
| 6,350,195 B1 * | 2/2002 | Iino | 454/131 |
| 6,444,353 B1 | 9/2002 | Takaki et al. | |

FOREIGN PATENT DOCUMENTS

| | | |
|---|---|---|
| JP | 61-271121 | 12/1986 |
| JP | 7-232565 | 9/1995 |

\* cited by examiner

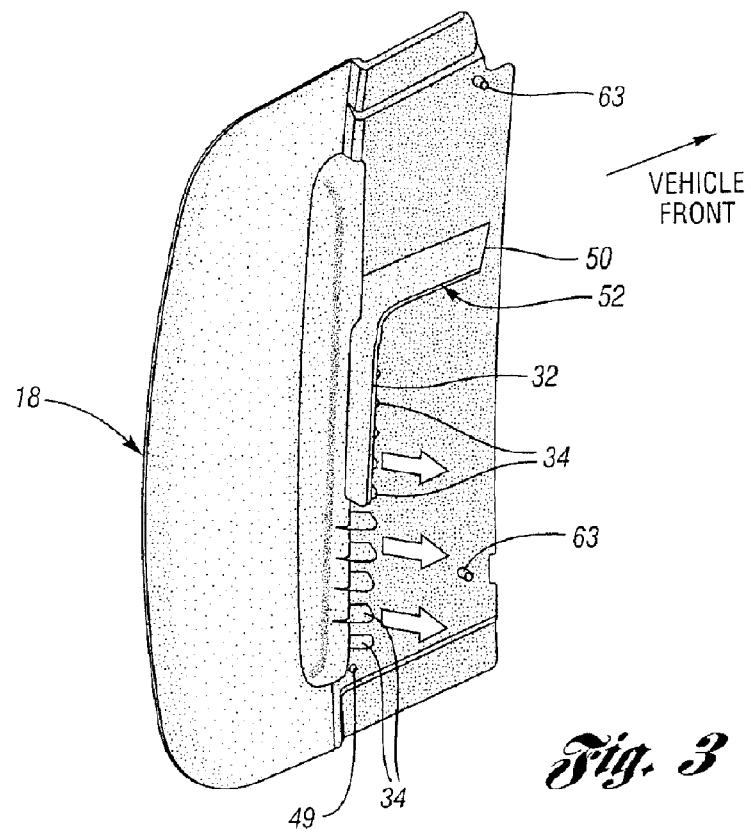
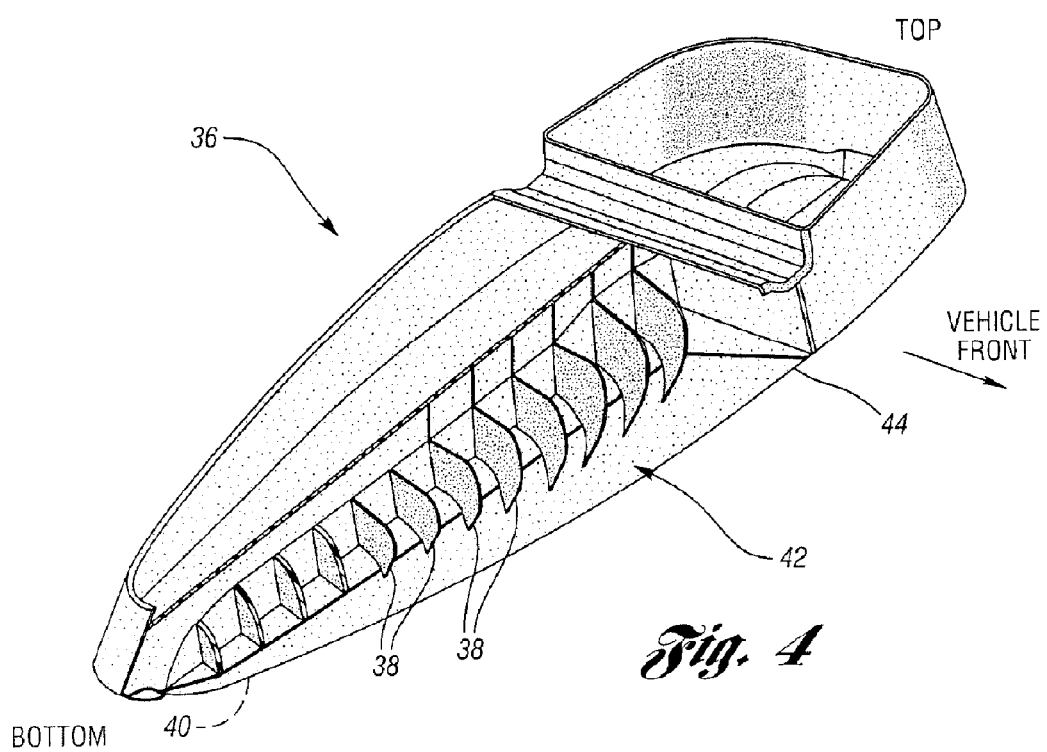

VEHICLE AND FRESH AIR INTAKE FOR A VEHICLE

CROSS-REFERENCE TO RELATED APPLICATIONS

This application is a division U.S. application Ser. No. 10/605,182 filed Sep. 12, 2003, which is hereby incorporated herein by reference.

BACKGROUND OF THE INVENTION

1. Field of the Invention

The present invention relates to a vehicle and a vehicle fresh air intake that inhibits water ingestion.

2. Background Art

A vehicle may use ambient air from outside of the vehicle for a number of purposes. For example, vehicle radiators utilize ambient air to transfer heat from the engine coolant, to keep the engine from overheating. Outside air may also be mixed with fuel and supplied to the engine. Moreover, outside air may be utilized by heating, ventilation, and air conditioning systems (HVAC), which in turn maintain the climate of the vehicle passenger compartment. Of course, other vehicle systems may utilize outside air for a number of reasons, including the cooling of electrical components. When electrical components overheat, their performance may degrade or their life span may be compromised. Thus, adequate cooling for electrical components is an important consideration in vehicle design.

One example of a vehicle system that requires adequate cooling a bank of batteries used to power an electric vehicle. Other types of vehicle architectures—e.g., hybrid electric vehicles (HEV) and fuel cell vehicles—may similarly have power generating systems that emit large quantities of heat. Thus, it may be desirable to provide ambient air either directly to these systems, or to an HVAC that may further lower the air temperature to more effectively cool the vehicle system. One example of a fresh air intake used to take in ambient air to cool a bank of batteries in an electric vehicle is found in U.S. Pat. No. 5,392,873, issued to Masuyama et al. on Feb. 28, 1995. Masuyama et al. describes a structure for holding the batteries that includes an air intake passage. The air intake for the battery compartment is disposed beneath the vehicle, with an inlet facing upward toward the vehicle undercarriage. Because the inlet is disposed beneath the vehicle, liquid and solid debris from the road surface may enter the air intake. The air intake is provided with a chamber where liquid and other foreign material may be trapped prior to entering the battery compartment. The location of the air intake below the vehicle may increase the likelihood of taking in road debris.

Thus, there exists a need for a vehicle air intake configured to facilitate air transfer from an ambient environment outside the vehicle to a vehicle space, such that the air intake can be disposed on a portion of the vehicle away from the surface of the road, thereby reducing or eliminating the intake of road debris, while also inhibiting the transfer of water from the air intake to the vehicle space.

SUMMARY OF THE INVENTION

Therefore, an air intake for a vehicle configured to facilitate air transfer from an ambient environment outside the vehicle to a vehicle space is provided. The air intake includes a housing, a portion of which is configured for attachment to a vehicle window. The housing includes an inlet which is configured to be disposed along one edge of the window.

The invention also provides an air intake for a vehicle configured to facilitate air transfer from an ambient environment outside the vehicle to a vehicle space, while inhibiting liquid transfer from the ambient environment to the vehicle space. The air intake includes a housing having an inlet for receiving air from the ambient environment, and an outlet in communication with the inlet. The outlet is disposed in an upper portion of the housing and facilitates air transfer from the housing to the vehicle space. A first dam is disposed within the housing adjacent the inlet for preventing upward fluid flow from the inlet directly to the outlet, thereby inhibiting liquid flow through the outlet.

The invention further provides an air intake for a vehicle configured to facilitate air transfer from an ambient environment outside the vehicle to a vehicle space, while inhibiting liquid transfer from the ambient environment to the vehicle space. The air intake includes an inlet for receiving air from the ambient environment. A first chamber is adjacent the inlet and in communication with the inlet. The first chamber is partially defined by an upper boundary configured to prevent upward fluid flow out of the first chamber. A plurality of vanes are disposed adjacent to each other and in relation to the inlet such that the vanes direct the fluid flow from the inlet to the first chamber. A second chamber is adjacent the first chamber and has a common wall therebetween. The second chamber includes an upper portion and a lower portion; the lower portion is open to the first chamber. An outlet is in communication with the inlet. The outlet is disposed adjacent the second chamber upper portion, thereby facilitating air transfer from the second chamber to the vehicle space.

The invention also provides a vehicle having a window, a battery compartment, and an air intake configured to facilitate air transfer from an ambient environment outside the vehicle to the battery compartment, while inhibiting liquid transfer from the ambient environment to the battery compartment. The air intake includes a housing disposed adjacent the window. The housing includes an inlet disposed along one edge of the window for receiving air from the ambient environment. The housing also includes an outlet in communication with the inlet. The outlet is disposed in an upper portion of the housing and facilitates air transfer from the housing to the battery compartment. A first dam is disposed within the housing adjacent the inlet for preventing upward fluid flow from the inlet directly to the outlet, thereby inhibiting liquid flow through the outlet.

The above objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a perspective view of a first portion of a housing of the air intake;

FIG. 4 is a perspective view of a portion of an alternative embodiment of the air intake shown in FIGS. 1–3;

DETAILED DESCRIPTION OF THE PREFERRED EMBODIMENT(S)

Figure 1:
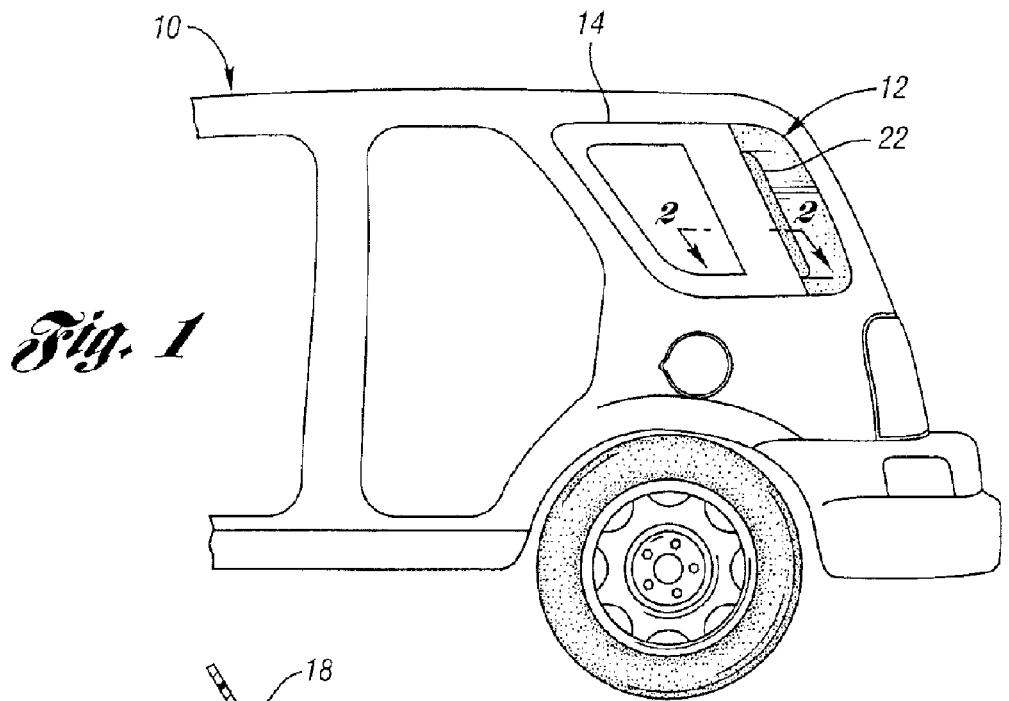
FIG. 1 is a partial fragmentary side view of a vehicle including an air intake in accordance with the present invention.

FIG. 1 shows a portion of a vehicle 10 having an air intake 12 in accordance with the present invention. The air intake 12 is attached to a rear quarter window 14 of the vehicle 10. Although the air intake 12 may be located adjacent the window 14, it may be placed in other convenient locations, such as adjacent a vehicle body panel.

Figure 2:
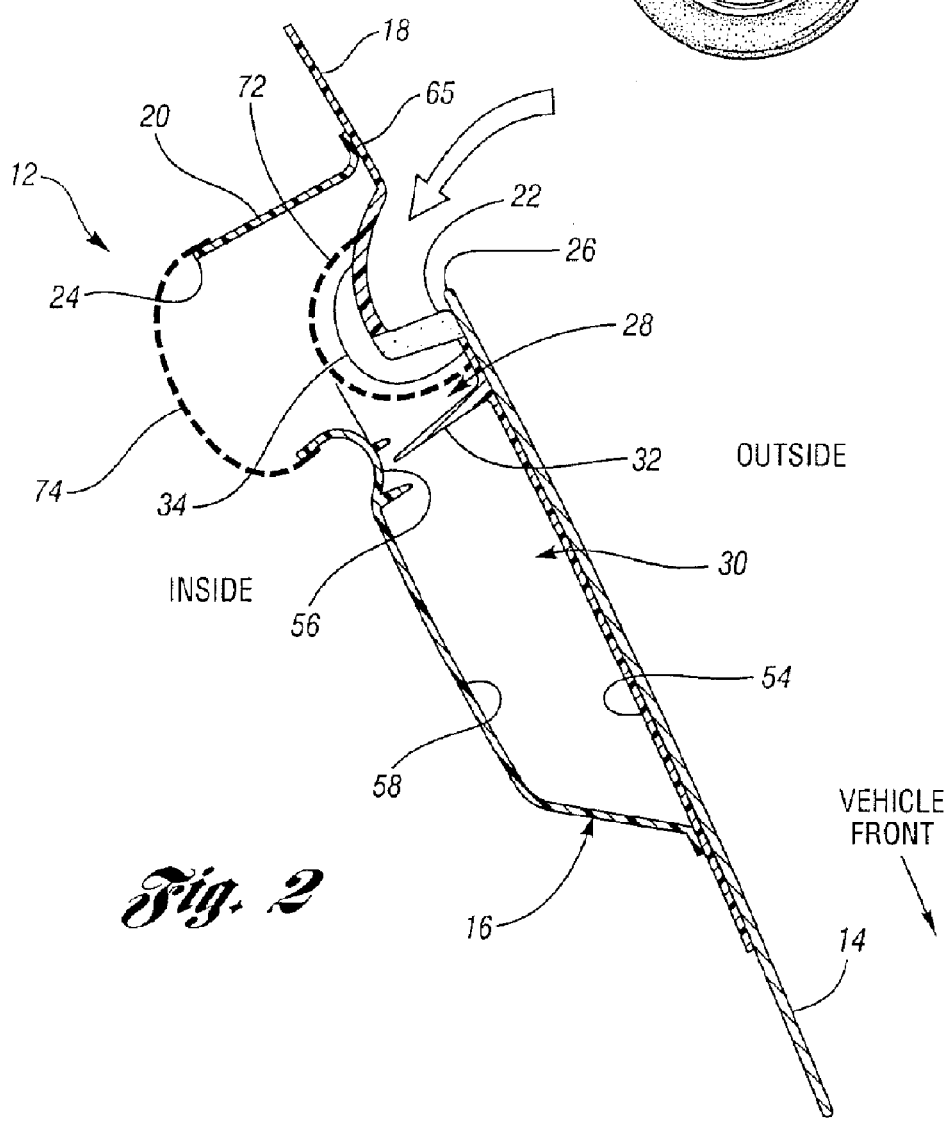
FIG. 2 is a sectional view of the air intake shown in FIG. 1, taken through line 2—2.

A sectional view of the air intake 12, taken through section line 2-2 in FIG. 1, is shown in FIG. 2. As seen in FIG. 2, the air intake 12 includes a housing 16, having a first portion 18 and a second portion 20. The first portion 18 includes an inlet 22 that is open to an ambient environment outside the vehicle 10. The second portion 20, includes an outlet 24 in communication with the inlet 22. As explained more fully below, ambient air from outside the vehicle enters the inlet 22, flows through the housing 16, and out of the outlet 24 to a vehicle space. In the embodiment shown in FIGS. 1–2, the inlet 22 is disposed adjacent one edge 26 of the window 14. Within the housing 12, there are first and second chambers 28, 30 having a wall 32 disposed therebetween.

FIG. 3 shows an isolated view of the first housing portion 18. A plurality of vanes 34 are disposed adjacent to each other, and are disposed in relation to the inlet 22 such that they direct the flow of air from the inlet 22 into the first chamber 28. Because the first and second housing portions 18, 20 cooperate to form the first and second chambers 28, 30 the first chamber 28 is not visible in FIG. 3. Directional arrows are shown in FIG. 3 to indicate the general flow of air from the intake 22. Although the vanes 34 shown in FIG. 3 are relatively short and generally straight, it is contemplated that they may be configured differently to have a greater effect on the air flow.

For example, as seen in FIG. 3, the vanes 34 extend a relatively short distance into the first chamber 28; however, vanes may be configured to extend further into the first chamber, or alternatively, not at all. In addition to directing the air into the housing, vanes, such as the vanes 34, may also breakup a water stream entering an air intake inlet. Vanes may be configured to provide an almost horizontal air flow into a housing, or may be angled to direct the air flow either up or down. As used here and throughout, directions such "up" and "down" refer to an air intake as installed in a vehicle. Still other vane configurations include curved vanes, or a combination of curved and straight portions.

One such example is illustrated in FIG. 4, which shows a portion of an air intake 36 having a plurality of vanes 38 disposed adjacent an inlet 40, which is on the opposite side of the air intake 36 as shown in FIG. 4. As in the embodiment shown in FIGS. 1–3, the vanes 38 direct the flow of air from the inlet 40 into a first chamber 42, only a portion of which is shown in FIG. 4. The vanes 38 increase in length as they near an upper portion 44 of the air intake 36. In addition, the vanes 38 are curved so as to direct air flow from the inlet 40 in a generally downward direction. As explained more fully below, this helps inhibit water taken in from the ambient environment outside the vehicle from flowing into the vehicle space along with the air.

Figure 5:
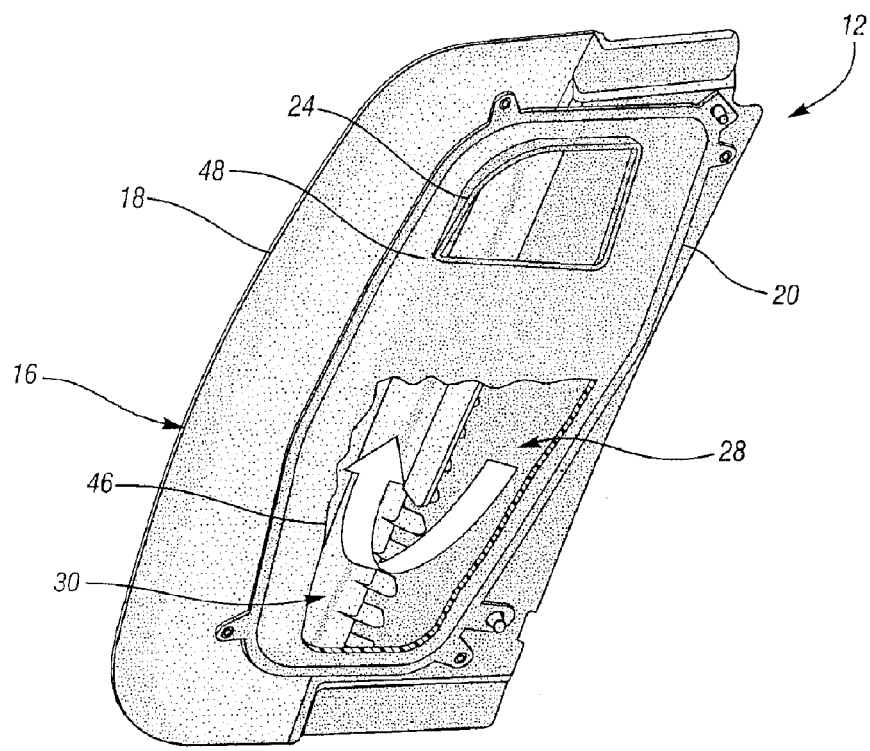
FIG. 5 is a partial fragmentary view of the air intake shown in FIGS. 1–3 indicating the direction of air flow within the housing.

Returning to FIG. 3, it is seen that the vanes 34 are not curved like the vanes 38, shown in the embodiment in FIG. 4. Despite this, at least some of the air flowing into the first chamber 28 of the air intake 12 will flow in a generally downward direction prior to entering the second chamber 30; this is illustrated in FIG. 5. The second chamber 30 includes a lower portion 46 that is open to the first chamber 28. The second chamber 30 also includes an upper portion 48 which is adjacent the outlet 24. Thus, as shown in the cutaway in FIG. 5, air from the first chamber 28 moves in a generally downward direction into the second chamber 30 before moving upward and through the outlet 24. In this way, water which may enter the inlet 22 along with air from the ambient environment outside the vehicle, will be forced toward the bottom of the housing 16, and will be inhibited from reaching the outlet 24 and flowing into a vehicle space. Water which is forced to the bottom of the housing 16 may exit the air intake 12 through the inlet 22, or through a drain hole 49, provided in the first housing portion 18, see FIG. 3.

In order to direct the flow of air from the inlet 22 in a generally downward direction, fluid flow in the first chamber 28 is forced into the lower portion 46 of the second chamber 30. This is accomplished by using a first dam 50, shown in FIG. 3. The first dam 50 is an upper boundary which partially defines the first chamber 28. The first dam 50 prevents the upward flow of fluid out of the first chamber 28. The wall 32 forms a second dam which is adjacent to the inlet 22 and the first dam 50. The first and second dams 50, 32 cooperate to force air from the inlet 22 in a generally unshaped flow path toward the outlet 24, which separates water from the air. In the embodiment shown in FIG. 3, the first and second dams 50, 32 form a unitary blocking structure 52 that is integrally molded with the first housing portion 18.

Figure 6:
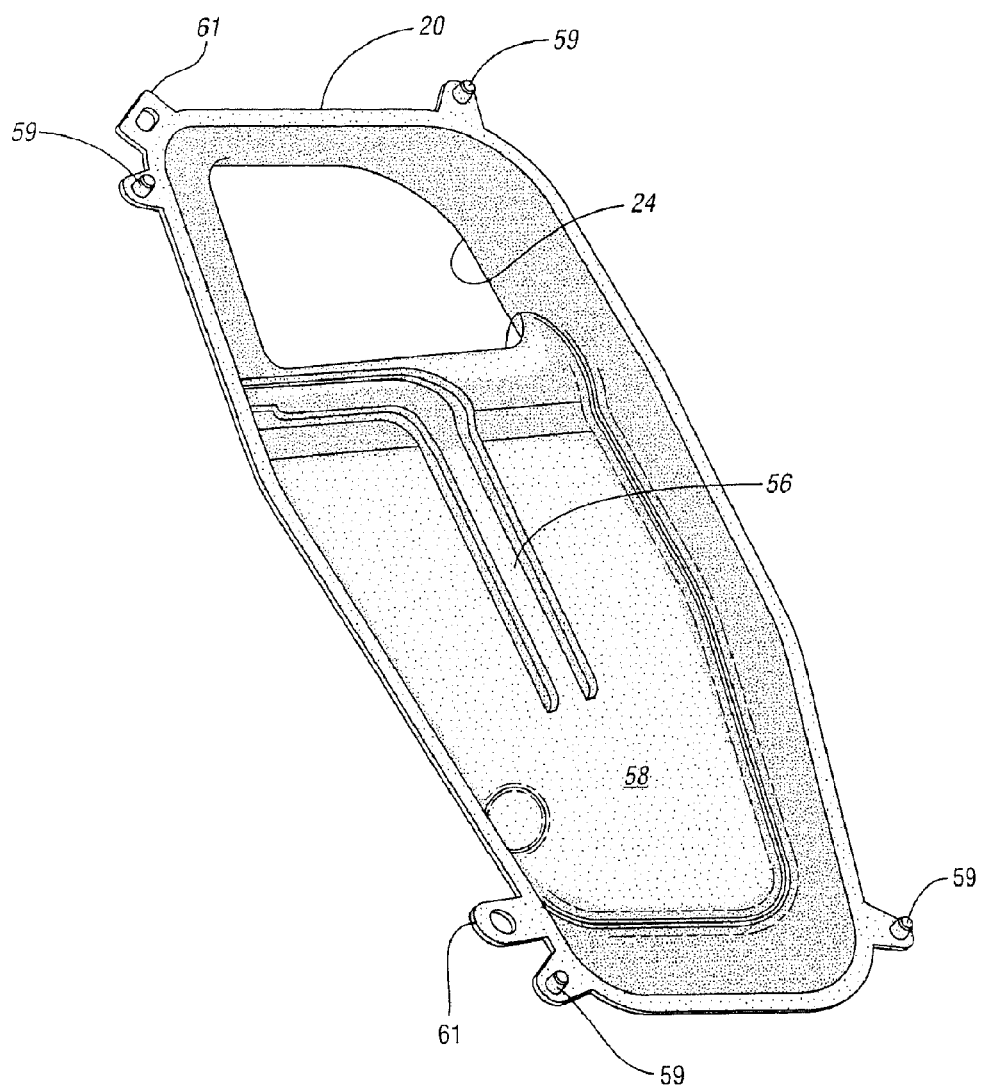
FIG. 6 is a perspective view of a second portion of the air intake housing.

As seen in FIG. 2, the second dam 32, and indeed the entire blocking structure 52, extend from an inner surface 54 of the first housing portion 18 toward the second housing portion 20. To help prevent fluid from flowing between the blocking structure 52 and the second housing portion 20, a channel 56 is provided in the second housing portion 20. As shown in FIGS. 2 and 6, the channel 56 is raised up from an inner surface 58 of the second housing portion 20. Of course, a channel, such as the channel 56, may be formed under the inner surface of a housing. A sealing material, such as foam, adhesive or the like may be disposed in the channel 56 to further prevent fluid from flowing between the blocking structure 52 and the second housing portion 20.

Of course, a blocking structure, such as the blocking structure 52, could be integral with the second housing portion 20, or alternatively, it need not be integral with the housing at all. For example, individual dams could be manufactured separately and placed in grooves or channels prior to assembling the housing. The housing could be configured to accommodate a number of different dams and/or blocking structures, thereby allowing a degree of flexibility in the manufacturing of an air intake. As desired, different sealing materials could be used to help prevent fluid flow past the dams.

The housing 16 described herein, includes two housing portions 18, 20. Of course, a housing, such as the housing 16, may include a single portion, or more than two portions, as desired. With regard to the housing 16, it is contemplated that the two portions 18, 20 may be made from different materials, and joined with a polymeric adhesive, such as urethane. To accommodate the use of a urethane adhesive, the second housing portion may be configured with standoff pins 59 to maintain a gap between the two housing portions 18, 20 after they are assembled. Alternatively, the housing portions 18, 20 may be joined with other types of adhesives, or even mechanical fasteners, such as screws or rivets. As seen in FIG. 6, the second housing portion 20 includes flanges 61, which are used in conjunction with locating pins 63 on the first housing portion 18, see FIG. 3.

The use of different materials for each housing portion may accommodate the different functions of the two housing portions 18, 20. For example, the first housing portion 18, has an outer surface 65 exposed to the ambient environment, see FIG. 2. In addition, the outer surface 65 is visible from the vehicle exterior, where it may be desirable to present an aesthetically pleasing appearance. Thus, an abrasion resistant polymer, such as a polycarbonate, which may also provide an appearance finish, may provide the desired combination of properties for the first housing portion 18.

Unlike the aesthetic considerations which may be present for the material selection of the first housing portion 18, different properties may be more important for the second housing portion 20. For example, strength may be a primary consideration, since the second housing portion 20 is not visible from the vehicle exterior. Hence, an acrylonitrile butadiene styrene (ABS) or polypropylene (PP) may be well suited for the second housing portion 20. Of course, the foregoing are merely examples of some of the materials from which the housing 16 may be made. Different considerations may be present for various embodiments of the present invention, and other polymers or even other classes of materials may be desired for a particular application.

Figure 7:
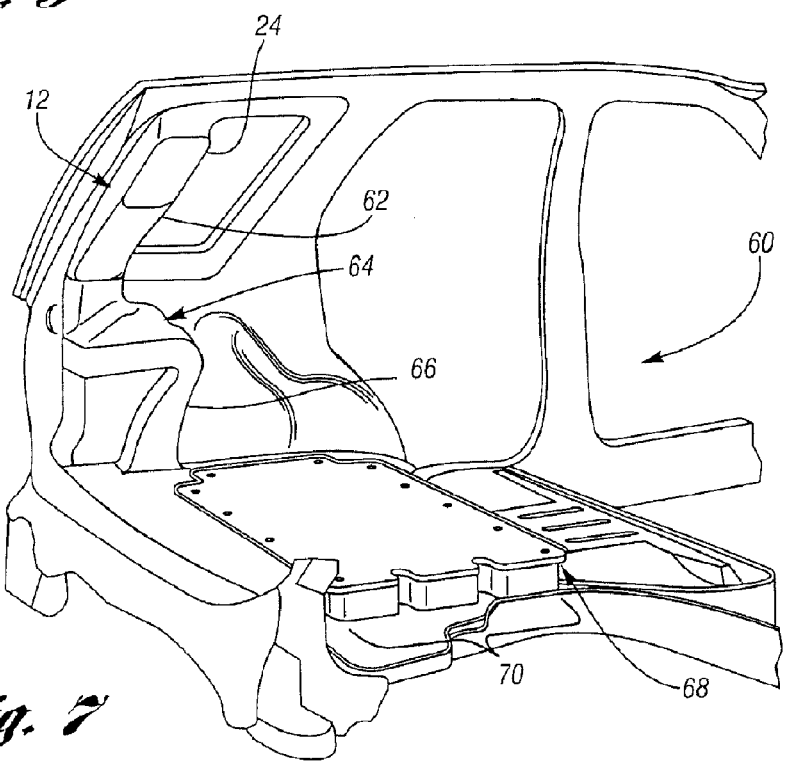
FIG. 7 is a partial fragmentary perspective view of a portion of a vehicle including an air intake, air conditioning system, and a battery compartment.

As briefly discussed above, an air intake, such as the air intake 12, may be used to transfer air from an ambient environment outside a vehicle to a vehicle space. The air may flow directly through the air intake and into the vehicle space, or it may flow into some type of air conditioning system prior to reaching the vehicle space. One such air conditioning system is described in copending U.S. patent application Ser. No. 10/605,179, entitled "Cooling System for a Vehicle Battery", filed on Sep. 12, 2003, and hereby incorporated herein by reference. FIG. 7 shows an interior portion 60 of the vehicle 10. The outlet 24 of the air intake 12 is attached to a duct 62 which transfers air from the outlet 24 to an air conditioning system 64.

The air conditioning system 64 draws fresh air in through the inlet 22 with a blower fan, and outputs cooled air through a duct 66 and into a battery compartment 68. Supplying the battery compartment 68 with cool air from the air conditioning system 64, will help cool battery assembly 70, thereby helping to extend its life. Of course, air taken in from an air intake, such as the air intake 12, may be routed to any desired vehicle space, or into another type of air conditioning system—e.g., an air conditioning system used to cool the vehicle passenger compartment. An example of an air conditioning system that can be used to cool both a battery compartment and a passenger compartment is described in copending U.S. patent application Ser. No. 10/605,181, entitled "Vehicle Cooling System", filed on Sep. 12, 2003, and hereby incorporated herein by reference.

As described above, the air intake 12 helps to inhibit water taken in from the ambient environment outside the vehicle 10 from flowing through the outlet 24. Thus, the air conditioning system 64 receives little or no water from the air intake 12. In addition, because the air intake 12 may be disposed high up on a vehicle away from the surface of the road, it is unlikely that road debris or other solid matter will enter the inlet 22. If, however, some solid matter does enter the air intake 12, it will be forced downward with the air flow toward the bottom of the housing 16, where it is free to exit the air intake 12 through the inlet 22. Although it may be unlikely that any solid matter would be carried upward and out of the outlet 24, additional protection is easily added to the air intake 12. If desired, one or more air-permeable barriers, such as screens, may be added to the air intake 12 to prevent solids, and to some extent liquids, from reaching the vehicle space. For example, returning to FIG. 2, screens 72, 74 are shown adjacent the inlet 22 and the outlet 24, respectively. Of course, screens, or other air-permeable barriers, may be placed at different locations on or in the air intake 12 as desired.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle, comprising:
   a window;
   a vehicle space; and
   an air intake including a housing having an inlet disposed adjacent the window for receiving air from an ambient environment outside the vehicle, and an outlet in communication with the inlet, the outlet being disposed in an upper portion of the housing and facilitating air transfer from the housing to the vehicle space, the air intake further including a first dam disposed within the housing adjacent the inlet for preventing upward fluid flow from the inlet directly to the outlet, thereby inhibiting liquid flow through the outlet.

2. The vehicle of claim 1, wherein the air intake further includes an air-permeable barrier disposed adjacent the outlet for inhibiting passage of non-gases through the outlet.

3. The vehicle of claim 1, wherein the vehicle space includes a battery compartment.

4. The vehicle of claim 1, wherein the air intake further includes a plurality of vanes disposed adjacent each other and disposed in relation to the inlet such that the vanes direct fluid flow from the inlet into the housing.

5. The vehicle of claim 4, wherein at least some of the vanes are configured to direct fluid flow from the inlet into the housing in a generally downward direction.

6. The vehicle of claim 1, wherein the air intake further includes a second dam disposed within the housing adjacent the inlet and the first dam, and configured to cooperate with the first dam to direct at least some fluid flow from the inlet in a generally downward direction.

7. The vehicle of claim 6, wherein the first and second dams cooperate to force at least some fluid flow from the inlet in a generally u-shaped flow path toward the outlet.

8. A vehicle, including:
   a vehicle space; and
   an air intake including,
   a) an inlet for receiving air from an ambient environment outside the vehicle,
   b) a first chamber adjacent the inlet and in communication with the inlet, the first chamber being partially defined by an upper boundary configured to prevent upward fluid flow out of the first chamber,
   c) a plurality of vanes disposed adjacent to each other and in relation to the inlet such that the vanes direct fluid flow from the inlet to the first chamber, d) a second chamber adjacent the first chamber and having a common wall therebetween, the second chamber including an upper portion and a lower portion, the lower portion being open to the first chamber, and e) an outlet in communication with the inlet, and disposed adjacent the second chamber upper portion, thereby facilitating air transfer from the second chamber to the vehicle space.

9. The vehicle of claim 8, wherein at least some of the vanes are configured to direct fluid from the inlet into the first chamber in a generally downward direction.

10. The vehicle of claim 8, wherein the vehicle space includes a battery chamber.

11. The vehicle of claim 8, wherein the air intake further includes an air-permeable barrier disposed adjacent the inlet for inhibiting passage of non-gases from the ambient environment into the first chamber.

12. The vehicle of claim 8, wherein the air intake further includes an air-permeable barrier disposed adjacent the outlet for inhibiting passage of non-gases through the outlet.

13. The vehicle of claim 8, wherein the air intake further includes a housing including first and second portions, the first portion including the inlet, the second portion including the outlet, and the first and second portions cooperating to form the first and second chambers.

14. The vehicle of claim 13, further comprising a window, and wherein the first housing portion is configured for attachment to the window, and the inlet is configured to be disposed along one edge of the window.

* * * * *